(12) United States Patent
Pierce

(10) Patent No.: US 10,307,005 B1
(45) Date of Patent: Jun. 4, 2019

(54) FILTERED DRINKING STRAW

(71) Applicant: LaMonte' D. Pierce, Jackson, MS (US)

(72) Inventor: LaMonte' D. Pierce, Jackson, MS (US)

(*) Notice: Subject to any disclaimer, the term of this patent is extended or adjusted under 35 U.S.C. 154(b) by 91 days.

(21) Appl. No.: 15/471,650

(22) Filed: Mar. 28, 2017

(51) Int. Cl.
| | |
|---|---|
| *C02F 1/28* | (2006.01) |
| *B01D 15/00* | (2006.01) |
| *A47G 21/18* | (2006.01) |
| *B01D 29/58* | (2006.01) |
| *C02F 1/00* | (2006.01) |
| *B01D 24/00* | (2006.01) |
| *B01D 24/16* | (2006.01) |
| *B01D 35/30* | (2006.01) |
| *C02F 101/12* | (2006.01) |
| *C02F 101/20* | (2006.01) |

(52) U.S. Cl.
CPC ......... *A47G 21/188* (2013.01); *B01D 24/008* (2013.01); *B01D 24/16* (2013.01); *B01D 29/58* (2013.01); *B01D 35/30* (2013.01); *C02F 1/002* (2013.01); *C02F 1/283* (2013.01); *B01D 2101/02* (2013.01); *B01D 2101/04* (2013.01); *C02F 2101/12* (2013.01); *C02F 2101/20* (2013.01)

(58) Field of Classification Search
CPC .. C02F 1/002; C02F 1/003; C02F 1/28; C02F 1/281; C02F 1/283; C02F 1/285; C02F 1/286; C02F 1/288; C02F 2303/04; C02F 2307/02; C02F 2307/04; C02F 9/005; A47G 21/188; A47G 21/183; B01D 2313/12; B01D 2313/20; B01D 2313/21

See application file for complete search history.

(56) References Cited

U.S. PATENT DOCUMENTS

| | | | | |
|---|---|---|---|---|
| 1,204,171 A | * | 11/1916 | McKay | ................ B01D 35/02 210/251 |
| 4,995,976 A | * | 2/1991 | Vermes | ................... C02F 1/002 210/266 |
| 5,156,335 A | | 10/1992 | Smith et al. | |
| 6,217,545 B1 | * | 4/2001 | Haldopoulos | ........ A47G 21/188 210/263 |

(Continued)

FOREIGN PATENT DOCUMENTS

| | | | |
|---|---|---|---|
| CN | 203545806 | * | 4/2014 |
| WO | WO9103427 | | 3/1991 |

OTHER PUBLICATIONS

English language machine translation of CN203545806, 5 pages, No Date.*

*Primary Examiner* — Pranav N Patel
(74) *Attorney, Agent, or Firm* — Hanrahan Law Firm, P.A.; Benjamin M. Hanrahan

(57) ABSTRACT

A filtered drinking straw for providing on demand filtered drinking water is presented herein. The straw includes an elongated body defining a first end, a second end and an internal passage disposed there between. At least one filter is positioned within the internal passage of the body for reducing an amount of impurities that may be contained in the fluid as the fluid flows there through. The filter may include a core with a mix of granulated materials such as activated granulated carbon, chlorine grain, and zeolite. One or more retention structures may also be provided for retaining the filter within the body of the straw. The retention structure(s) include one or more internal projections, a mouth cap and/or end cap.

10 Claims, 7 Drawing Sheets

(56) References Cited

U.S. PATENT DOCUMENTS

| | | |
|---|---|---|
| 6,811,036 B1 | 11/2004 | Vaiano et al. |
| 9,005,684 B2 | 4/2015 | Baron |
| 9,370,270 B1 | 6/2016 | Hsu |
| 2008/0116292 A1 | 5/2008 | Nesbitt et al. |
| 2008/0197141 A1 | 8/2008 | Felfoldi |
| 2009/0041904 A1 | 2/2009 | Baron |
| 2010/0032358 A1 | 2/2010 | Vestergaard Frandsen |
| 2010/0044321 A1 | 2/2010 | Vestergaard Frandsen |
| 2010/0155500 A1 | 6/2010 | Zaccheo |
| 2010/0258498 A1 | 10/2010 | Finelli |
| 2010/0276509 A1 | 11/2010 | Mauro |
| 2015/0034544 A1 | 2/2015 | Aftoora |

\* cited by examiner

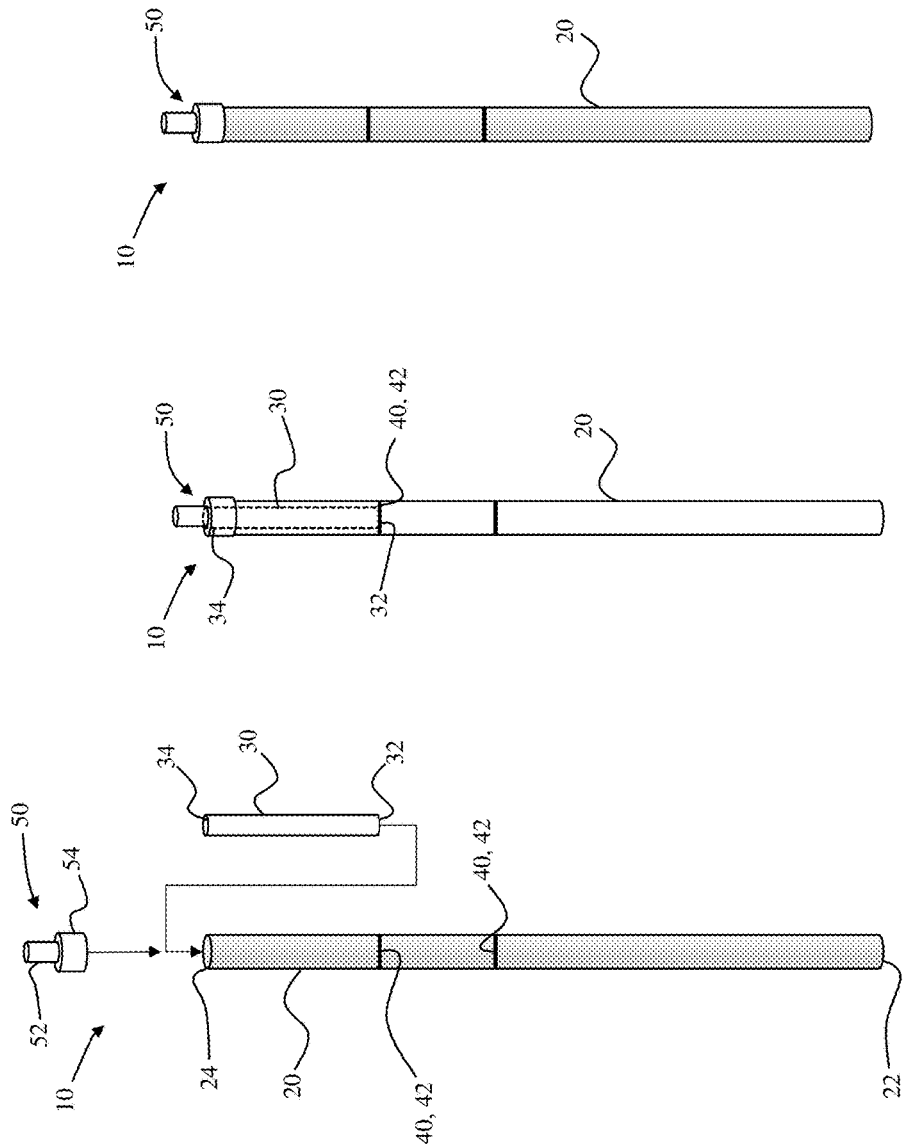

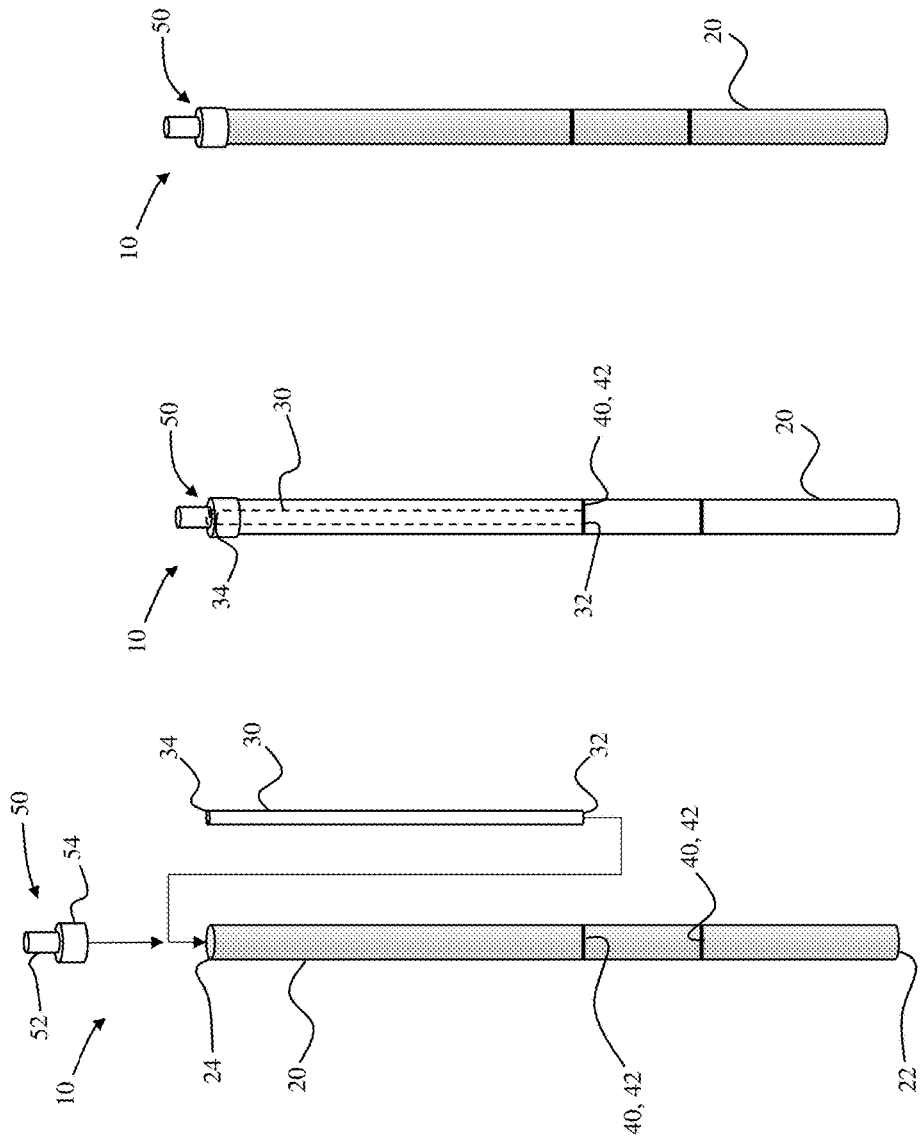

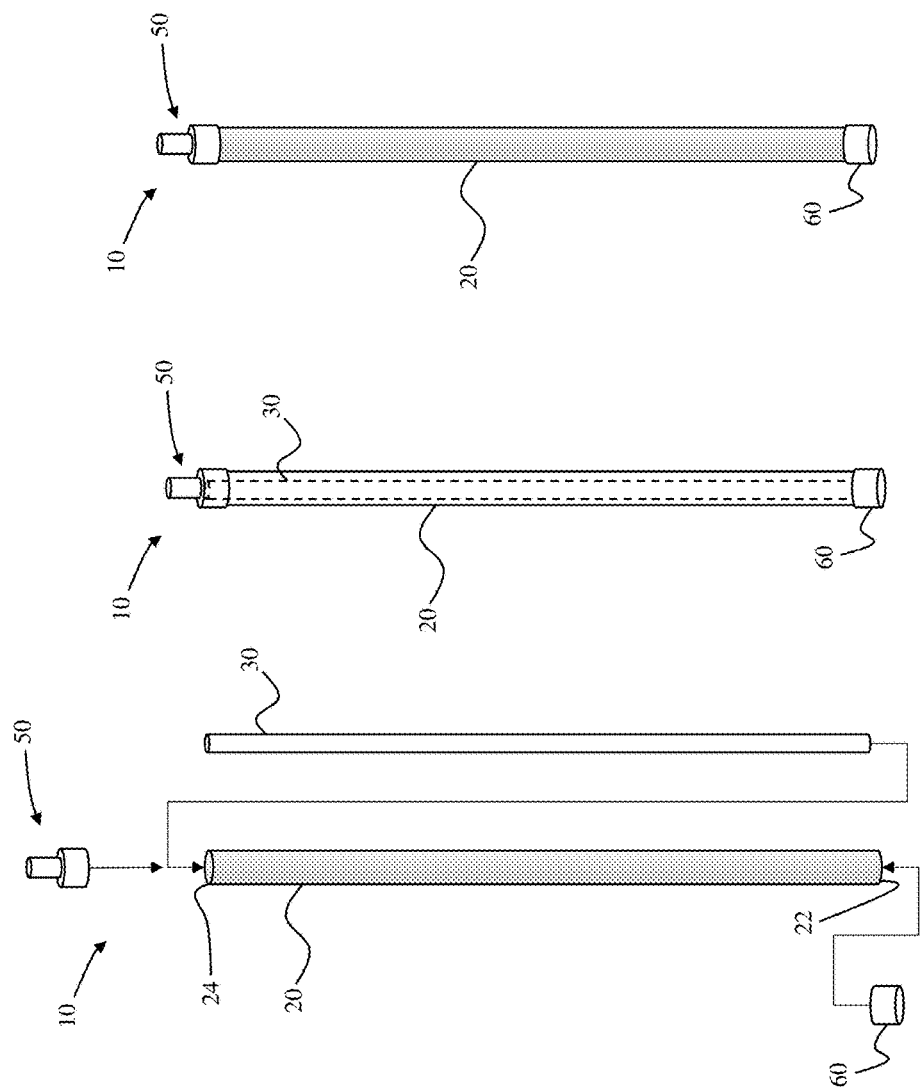

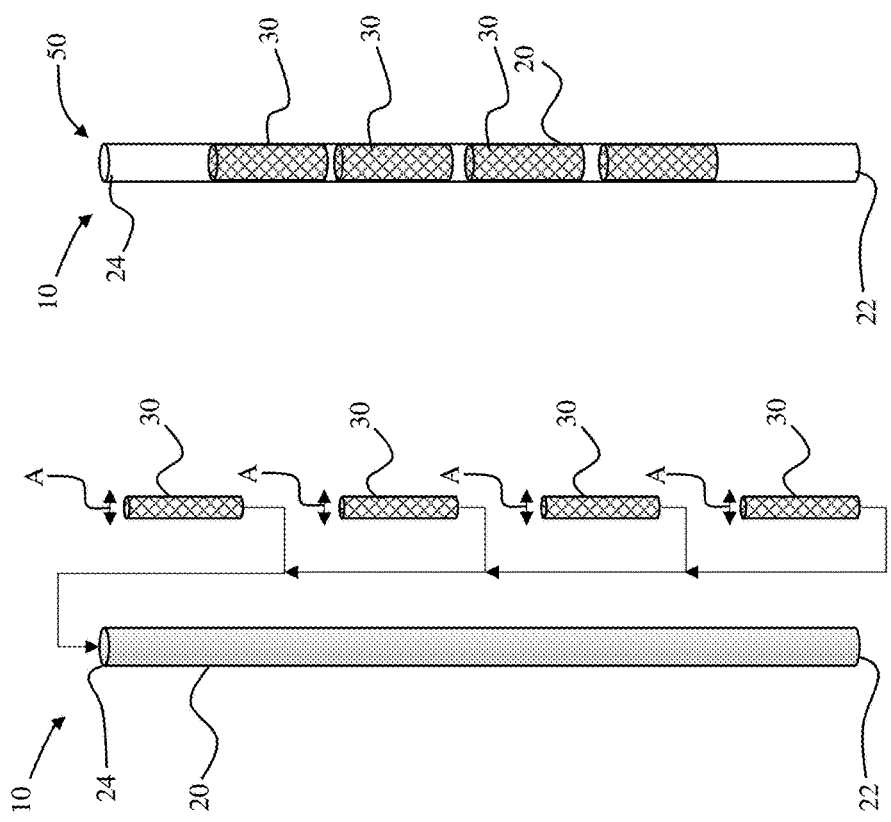

FILTERED DRINKING STRAW

FIELD OF THE INVENTION

The present invention is directed to a drinking straw with at least one filter medium disposed therein, the filter medium being adapted or structured to filter impurities, including bacteria and viruses, as well as chlorines, iodine, metals (such as lead and copper), sediments, etc., from a fluid (e.g., water) passing there through. The filtered drinking straw allows a user to obtain filtered water (or other fluid), in real time or on demand, for example, as the water or other fluid passes through the straw, the fluid is filtered and available for immediate consumption.

BACKGROUND OF THE INVENTION

The demand for filtered or purified drinking water is abundant, especially, but not limited to, in circumstances involving outdoor activities such as camping, hiking, or backpacking, or even at home, in the office, or in other day-to-day circumstances or environments. Particularly, water that may come from a tap source, such as a municipal water supply or water well, may contain some impurities such as, but not limited to chlorine, sediments, as well as metals (e.g., lead and copper). It is often desired to have these impurities removed prior to consuming the water.

With regard to tap water, municipal water, and/or well water, some products exist that include large containers or pitchers that can be used to supposedly filter the water. For example, a filter may be embedded or placed into the pitcher, allowing the tap water or other water to pass through the filter and into a retention portion of the pitcher. One problem, however, is that the water takes a significant amount of time to pass through the filter before it can be consumed. Accordingly, the water is not able to be filtered on demand or in real-time in that it must slowly pass through the filter and into the retention portion of the pitcher before it can be subsequently poured into a glass or other container for consumption.

Some other water filters, typically for use outdoors, may require the fluid to be filtered through a pump or other like mechanism. This is often time-consuming and in some cases, quite laborious. For example, water may first be obtained from a water source (e.g., a stream or lake) in a bucket or pan. Using a filter pump, the user may pump water from the bucket or pan, through the filtering mechanism, and into a bottle or other like container for subsequent consumption. Again, this process is often time consuming, laborious, and requires multiple containers and in some cases, multiple people.

Other filtering or purification systems may include chemical disinfectants, such as iodine-based or chlorine-base pills or tablets. These tablets can be dropped into a container of fluid, such as water, for purification purposes. However, methods involving chemical disinfectants such as iodine or chlorine tablets are extremely time consuming, and can take approximately 30 minutes or more to complete. In certain environments and circumstances, such as camping or hiking, this can be quite an inefficient use of time and, in many cases, can be inconvenient or worse, dangerous, especially in the event drinking water is needed on-demand or immediately.

There is thus a need in the art for a device that can be used to quickly obtain filtered and/or purified water and other fluids, for example, on-demand. Accordingly, the proposed invention disclosed herein is directed to a filtered drinking straw that includes one end (e.g., a bottom or first end) that can be placed in the water or other fluid, a filter medium disposed within the straw for receiving and filtering the fluid, and a second or top end where a user can place his or her mouth for receiving and drinking the filtered water or fluid, on-demand.

In this manner, the proposed filtered drinking straw can be used to obtain filtered water directly from the source, for example, directly from a river, stream or lake. Other applications may include everyday activities by filtering tap water from a faucet for from a glass or cup. Thus, a user may obtain tap (or other) water from a faucet, for example, by pouring tap water into a glass. The user can filter the tap water, on-demand, as the user pulls or suctions the tap water through the straw and directly into his or her mouth for consumption.

SUMMARY OF THE INVENTION

Accordingly, the various embodiments of the present invention are directed to a filtered drinking straw structured to provide on-demand filtered drinking water. For instance, the straw includes an elongated body defining a first end, a second end and an internal passage disposed there between. The internal passage is configured to allow a fluid, such as water, to flow into the first end, through the internal passage and out of the second end, for example, when the first end is at least partially submerged in the fluid and an amount of suction is applied at or to the second end.

The straw further includes one or more filter mediums disposed within the internal passage of the body, at least partially between the first end and the second end. The filter medium(s) is/are configured and structured to allow the fluid to flow there through while reducing an amount of impurities contained in the fluid such that the fluid that flows out of the second end of the body has fewer impurities (e.g., sediment, chlorine, metal(s), and in some cases, bacteria, viruses, etc.) than the fluid that flows into the first end of the body.

For example, in at least one embodiment, the filter medium comprises a core or device that is configured to slide or otherwise fit within at least a portion of the body. The filter, in some embodiments, may include a mix of a plurality of granulated, rocky and/or sand-like materials that are chosen for filtering and/or purification properties. For instance, the materials of the filter may include activated granulated carbon, anti-bacterial material(s), including but not limited to chlorine beads, chlorine grain, zeolite, zeolite grain, etc. Accordingly, the filter, and the materials thereof, may be used to help filter out lead and other contaminants as well as bacterial and viral contaminants. In some embodiments, the filter(s) may include a fibrous mesh-like structure constructed of activated carbon fiber (ACF). The filter may resemble a thin brillo pad, although it is made entirely or substantially of pure activated carbon fiber.

Furthermore, certain embodiments may, but need not necessarily include one or more retention structures that are configured to at least partially retain the filter within the body of the straw, and for example, restrict longitudinal movement of the filter therein. Accordingly, as described herein, the retention structure(s) may include one or more internal projections, ledges, or other like structures disposed on the inside of the body for engaging a portion of the filter and restricting movement thereof. Some embodiments may also include one of a mouth cap, an end cap, or both, which may act or function as a retention structure by engaging, contacting or restricting movement of the filter within the body of the straw.

It should also be noted that in some embodiments, the straw is intended to be discarded after a certain number of uses, or after an amount of fluid has been filtered or purified using the straw. For example, in at least one embodiment or implementation of the present invention, the filter is not intended to be removed or replaced, and the straw, including the filter, can be discarded after a certain amount of use—for example, after approximately 18.5 gallons of water is filtered through the straw. Of course, other amounts of water may be intended or implanted in other embodiments within the scope of the present invention.

These and other objects, features and advantages of the present invention will become more apparent when the drawings as well as the detailed description are taken into consideration.

BRIEF DESCRIPTION OF THE DRAWINGS

FIG. 1A is an exploded side elevation view of at least one embodiment of the filtered straw as described herein.

FIG. 1B is a cut-away view of the embodiment of the filtered straw illustrated in FIG. 1A.

FIG. 1C is a side elevation view of the embodiment of the filtered straw as illustrated in FIGS. 1A and 1B.

FIG. 2A is an exploded side elevation view of another embodiment of the filtered straw as described herein.

FIG. 2B is a cut-away view of the embodiment of the filtered straw illustrated in FIG. 2A.

FIG. 2C is a side elevation view of the embodiment of the filtered straw as illustrated in FIGS. 2A and 2B.

FIG. 3A is an exploded side elevation view of yet another embodiment of the filtered straw as described herein.

FIG. 3B is a cut-away view of the embodiment of the filtered straw illustrated in FIG. 3A.

FIG. 3C is a side elevation view of the embodiment of the filtered straw as illustrated in FIGS. 3A and 3B.

FIG. 6A is an exploded side elevation view of yet another embodiment of the filtered straw as described herein.

FIG. 6B is a cut-away view of the embodiment of the filtered straw illustrated in FIG. 6A.

Like reference numerals refer to like parts throughout the several views of the drawings provided herein.

DETAILED DESCRIPTION OF THE INVENTION

Figure 4A:
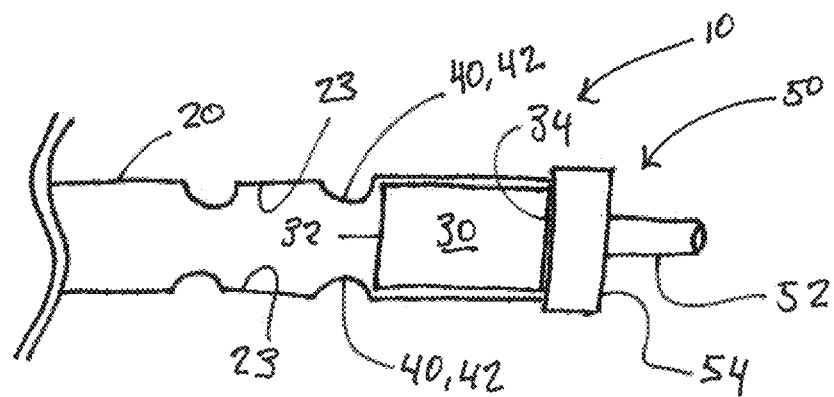
FIG. 4A is cut-away and internal view of at least one embodiment of the filtered straw as disclosed herein.
Figure 4B:
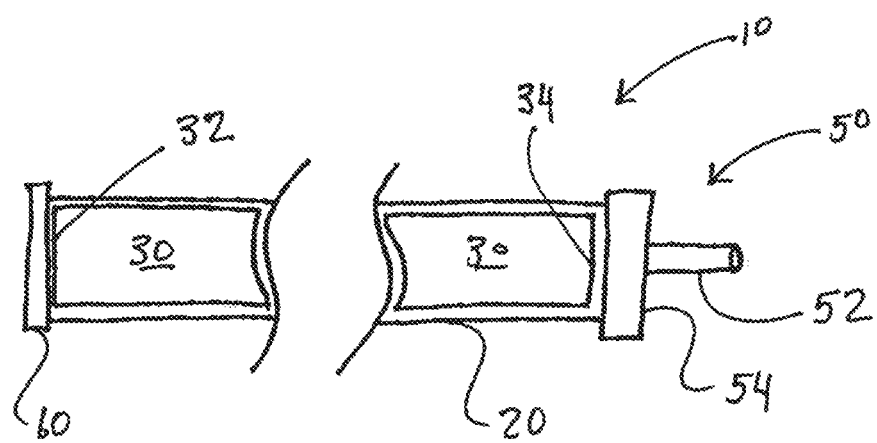
FIG. 4B is a cut-away and internal view of another embodiment of the filtered straw as disclosed herein.

As shown in the accompanying drawings, and with particular reference to FIGS. 1A through 3C, the present invention is directed to a filtered drinking straw, generally referenced as 10. Specifically, the filtered drinking straw 10 of the various embodiments of the present invention includes one or more filter mediums or filters 30 disposed on the inside of a body 20. As will be described herein, the length of the filter medium 30 and the length of the straw 10 or body 20 thereof, may vary depending on the embodiment or application, and the position or structures for retaining the filter medium 30 within the body 20 may vary. Either way, however, and regardless of the length, size or positioning of the filter medium 30, the filter medium 30 of the various embodiments is structured to receive a flow of fluid, such as, but in no way limited to water, and filter or purify the fluid as it flows through the filter medium 30. This allows a user to obtain filtered or purified water or other fluid in real time or on demand, for example, as the fluid passes from the water source, through the straw 10 and to the user's mouth for immediate consumption.

In particular, the straw 10 includes an elongated body 12, which in many cases, may include a cylindrically shaped configuration, for instance, such that a cross section of the body is round. Other embodiments of the body 20 may include different shapes within the scope of the present invention, for example, such that a cross section may be square, rectangular, hexagonal, etc. Furthermore, in at least one embodiment, the body 20 may be constructed of a durable material, whether flexible, partially flexible or rigid, that is lead-free, non-hazardous, and that is not harmful to humans even during short, one-time or multiple uses. Accordingly, the body 20 of at least one embodiment may be constructed of polyvinyl chloride (PVC) or other like plastics, and may be rigid, substantially rigid, or in some cases, flexible along the length or along one or more portion(s) of the length. Other embodiments of the body 20 may be constructed of metal such as aluminum or other like materials.

Furthermore, the elongated body 20 of the various embodiments includes a first or bottom end 22, a second or top end 24, such that the first and second ends 22, 24 may be longitudinally opposite one another. An internal passage 25 is defined or otherwise disposed between the first and second ends 22, 24 of the body 20 and adapted to allow a fluid to flow into the first end 22, through the internal passage 25 and out of the second end 24. Specifically, in order to facilitate the flow of fluid through the body 20, the first end 22 may be at least partially submerged in the fluid while an amount of suction is applied at or to the second end 24. In this manner, a user may place the first end 22 of the body 20 into a source of water, such as, for example, a glass of tap water, or even a lake, river, or pond, while applying a suction or negative pressure at or to the second end 24, for example, with the user's mouth. This can force or otherwise cause the fluid from the source to flow into the first end 22, through the body 20 or internal passage 25 and out of the second end 24, into the user's mouth.

Since there is a filter medium 30, or in some cases, a plurality of filter mediums 30, disposed within the straw 10 or body 20 thereof, fluid that flows through the internal passage 25 is passed through the filter(s) 30 before the fluid reaches the second end 24, or otherwise, before the user drinks the water or other fluid from the straw 10. The filter medium 30 is thus capable of reducing an amount of impurities that may be contained in the fluid, such that the fluid that flows out of the second end 24 of the body 20 may have fewer impurities than the fluid that flows into the first end 22 of the body 20.

For example, in at least one embodiment, the filter medium 30 comprises a core, tubular, cylindrical or other like structure, that is configured to slide or otherwise fit within at least a portion of the body 20. In some embodiments, the filter 30 may include a diameter between about four millimeters (4 mm) and seven millimeters (7 mm), although other dimensions and sizes are contemplated within the full spirit and scope of the present invention.

Furthermore, the filter(s) 30 may include a mix of a plurality of granulated, rocky and/or sand-like materials that are chosen for filtering and/or purification properties. For instance, the materials of the filter may be compressed or otherwise deposited into a core or tube, that is then disposed within the body 20 of the straw 10 for filtering and/or purifying the fluid passing there through. For instance, in at least one embodiment, the filter 30 may include materials such as activated granulated carbon, anti-bacterial material, including but not limited to chlorine beads, chlorine grain, zeolite, zeolite grain, and/or other materials structured to facilitate the practice of the present invention in the intended manner. Accordingly, the filter 30 and the materials thereof may be used to help filter out lead, sediment, and other contaminants as well as bacterial and viral contaminants. In particular, the chlorine beads or chlorine grains can help kill bacteria and viruses that may be present in the fluid, while the activated carbon can help facilitate filtering out the chlorine taste.

It should be noted that while chlorine can be used to kill bacteria and viruses that may be present in the fluid, it is possible for the bacteria to grow back within the same fluid within a relatively short amount of time, for example, when the water is settled. Thus, water that is filtered using chlorine is oftentimes not meant to sit or be stored for later consumption, as by doing so, the bacteria, viruses or other contaminants could potentially regrow within the same water or fluid. Accordingly, the straw 10 of certain embodiments of the present invention may include chlorine to kill any potentially present bacteria or viruses, while providing the filtered or purified water on demand for consumption immediately after filtration or purification.

In yet another embodiment, the filter medium(s) 30 may include activated carbon fiber (ACF), which is a new organic material that can be used to filter contaminants from water, such as, but not limited to, tap water. The filter(s) 30 may include a fibrous mesh-like form or structure, somewhat similar to a brillo pad, but made entirely or substantially from pure activated carbon. In certain embodiments, the filter(s) 30, such as the ACF filter(s), have a bore with micro-sized pores of a uniform size and distribution. For example, the pore size may be approximately one nano-microns. The bore, which is the smoothness, thickness and size of each pore, may be consistently the same size and shape, without random changes in pore sizes. This can be created by exposing coconut shells to high temperatures and/or pressures resulting in coconut shell activated carbon.

Furthermore, the filter(s) 30, such as the ACF, may have a filter iodine value or capacity which can reach more than 1500 mg/g. The filter iodine value or capacity in water purification is the amount of iodine absorption rate within the carbon atoms and can be used as an indication of total surface area. It should also be noted that in some embodiments, the filter(s) 30, and in particular the ACF, can function like a molecular sieve with filtering capabilities to strain over a span of 1500 square meters of mesh at a time.

Furthermore, certain embodiments of the straw 10 may include one or more retention structures, generally referenced as 40, which are designed and structured to at least partially retain or hold the filter medium 30 within the body 20 or otherwise with the internal passage 25 thereof. For instance, the one or more retention structures 40 of some embodiments will restrict longitudinal movement of the filter medium 30 within the body 20 such that the filter medium 30 may not be able to move past the retention structure(s) 40.

Figure 5:
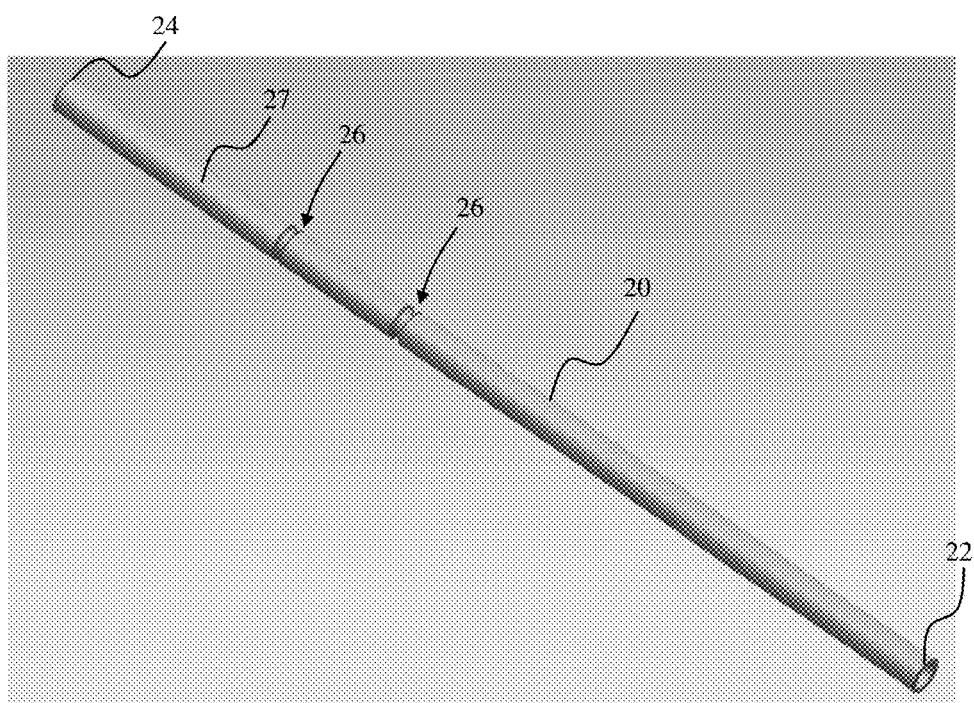
FIG. 5 is a perspective view of an exemplary straw as disclosed in accordance with at least one embodiment of the present invention.

With reference to FIGS. 1A, 1B, 1C and 4A, for example, the filter medium 30 of at least one embodiment may be disposed within the second end 24 of the body 20 and retained by one or more retention structures 40 disposed within the body 20. For instance, as best shown in FIG. 4A, the retention structure(s) 40 of at least one embodiment may include at least one internal projection or indentation, generally referenced as 42, disposed on and/or projecting inward from an inner wall or interior surface 23 of the body 20. Specifically, the body 20 may include one or more projections or indentations disposed on the inner wall or interior surface 23 thereof that will engage a portion of the filter medium 20, such as the first end 32 thereof. In this embodiment, the filter medium 30 will not be able to longitudinally slide past the internal projection(s) or retention structure(s) 40 thereof, but rather, one end, such as the first end 32, of the filter medium 30 may contact or engage the projection(s) 42, thereby restricting a further longitudinal movement within the body 20. As shown in the exemplary perspective view of the body 20 provided in FIG. 5, the projections may be visible from the exterior of the body 20 in the form of indented grooves 26 on exterior surface 27. However, other embodiments may include a smooth, continuous external surface with internal indentations 42 in the form of retention structure(s) 40.

Still referring to FIGS. 1A, 1B, 1C and 4A, at least one embodiment of the present invention further includes a cap or mouth cap 50 disposed on or connected to one end, such as the second end 24, of the body 20. For example, as illustrated, some embodiments of the cap 50 may include a mouth piece 52 extending outward from the second end 24 of the body 20, the mouth piece 52 being adapted to receive a person's mouth for application of suction or negative pressure to the second end 24 of the body 20. The cap 50 may also include a base 54 structured to engage the body 20 for connection thereto. The engagement may be in the form of a frictional engagement, threaded engagement, etc. Some embodiments may adhere the cap 50 or fixedly attach the cap 50 to the body 20 such that removal of the cap 50 from the body 20 is not intended. In such an embodiment, the straw 10 may be intended to be discarded after a certain number of uses, or after an amount of fluid has been filtered using the straw 10. For example, in at least one embodiment or implementation of the present invention, the filter 30 is not intended to be removed or replaced, and the straw 10, including the filter 30, can be discarded after a certain amount of use—for example, after approximately 18.5 gallons of water is filtered through the straw. Of course, other amounts of water may be intended or implanted in other embodiments within the scope of the present invention.

It is contemplated, however, that other embodiments, may allow the filter 30 to be removed and/or replaced. For example, in some implementations, the cap 50 may be removed, thereby exposing the internal passage 25 where the filter 30 is positioned. The filter 30 may, in certain circumstanced, be removed and replaced with another, preferably new filter, for extended or continued use of the straw 10.

In any event, still referring to the embodiment illustrated in FIGS. 1A, 1B, 1C and 4A, the cap 50 may also be considered a retention structure 40 in that it may, in some cases, engage one end, such as the second or top end 34, of the filter 30, so as to prevent or restrict movement of the filter 30 out of the straw 10. More specifically, with the cap 50 in place and engaged or connected to the second end 24 of the body 20, the filter 30 may be disposed between one retention structure 40, such as the internal projection(s) 42, and the cap 50, thereby preventing or otherwise at least partially restricting movement in a longitudinal direction of the filter 30, for example, past either the projections 42 or the cap 50.

FIGS. 2A, 2B and 2C illustrate a similar embodiment as that provided in FIGS. 1A, 1B, 1C and 4A, although the filter medium 30 illustrated in FIGS. 2A, 2B and 2C is longer than the filter medium 30 illustrated in FIGS. 1A, 1B, and 1C. In this manner, the internal projections 42 may be disposed at a different location along the length of the straw 10 in order to accommodate or otherwise retain a filter with a greater length.

FIGS. 3A, 3B, 3C, and 4B illustrate yet another embodiment. In this embodiment, the filter medium 30 may be disposed at least substantially along the length of the body 20, such that the first end 32 of the filter 30 is close in proximity to the first end 22 of the body 20, and the second end 34 of the filter 30 is close in proximity to the second end 24 of the body 20. To put it another way, the length of the filter 30 is substantially equal to the length of the body 20.

In such a case, the straw 10 may include a mouth cap 50 disposed on or connected to the second end 24 of the body 20 and an end cap 60 disposed on or connected to the first end of the body 20. Both the mouth cap 50 and the end cap 60 may function or otherwise act as retention structures 40 in that they may both at least partially retain or engage a corresponding end of the filter 30, thereby restricting longitudinal movement of filter 30. Specifically, the mouth cap 50 may prevent the filter 30 from inadvertently exiting the second end 24 of the body 20. Similarly, the end cap 22 may prevent the filter from inadvertently exiting the first end of the body 20.

It should be noted that both the mouth cap 50 and the end cap 60 may include internal passages allowing for the flow of fluid there through in a manner to facilitate the practice of the present invention in the intended manner. For instance, while the caps 50, 60 may prevent passage of the filter 30, they will still include an internal passageway for a flow of fluid, such as water, there through.

Accordingly, as described in accordance with at least one embodiment herein, the filter medium 30 includes a first end 32 and an oppositely disposed second end 34. In particular, the first end 32 of the filter medium 30 may be retained, engaged or contacted by at least one first retention structure 40, and the second end 34 of the filter medium 30 may be retained, engaged or contacted by at least another retention structure 40. In this manner, the filter medium 30 is at least partially retained within the body 20 by at least two spaced apart retention structures. The retention structures 40 may be internal projections 42, a cap such as a mouth cap 50 or an end cap 60, or other structures that are capable of facilitating the practice of the present invention in the intended manner.

For instance, in the embodiment shown in FIGS. 1A, 1B, 1C and 4A, the retention structures 40 that retain the filter medium 30 are the internal projections 42 and the mouth cap 50. In the embodiment shown in FIGS. 3A, 3B, 3C and 4B, the retentions structures 40 that retain the filter medium 30 are the mouth cap 50 and the end cap 60.

Figure 4C:
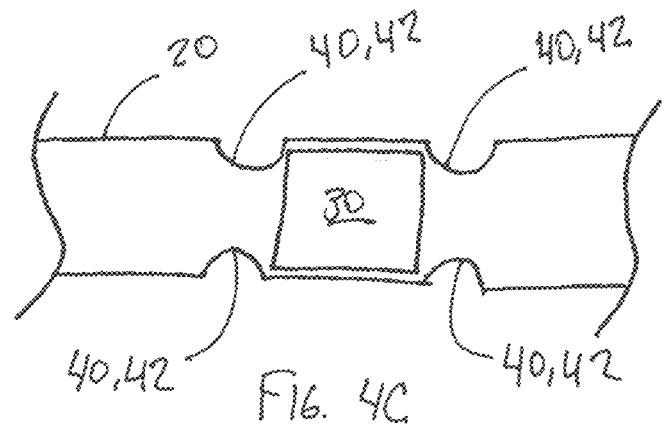
FIG. 4C is a cut-away and internal view of another embodiment of the filtered straw as disclosed herein.
Figure 4D:
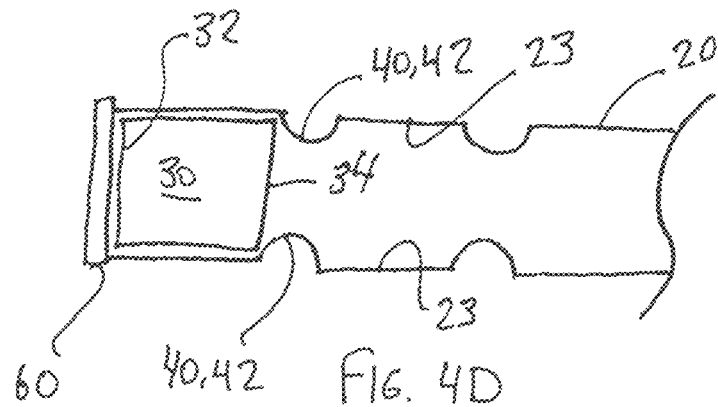
FIG. 4D is a cut-away and internal view of another embodiment of the filtered straw as disclosed herein.

Another embodiment is illustrated in FIGS. 4C and 4D. For example, with reference to FIG. 4C, the filter medium 30 may be disposed between spaced apart projections 42 such that the first end 32 of the filter may be engaged by one (or more) internal projections 42 and the second end 34 of the filter may be engaged by a different one (or more) internal projection(s) 42. In FIG. 4D, the filter medium 30 may be retained between an end cap 60 and one or more internal projections 42.

Figure 4E:
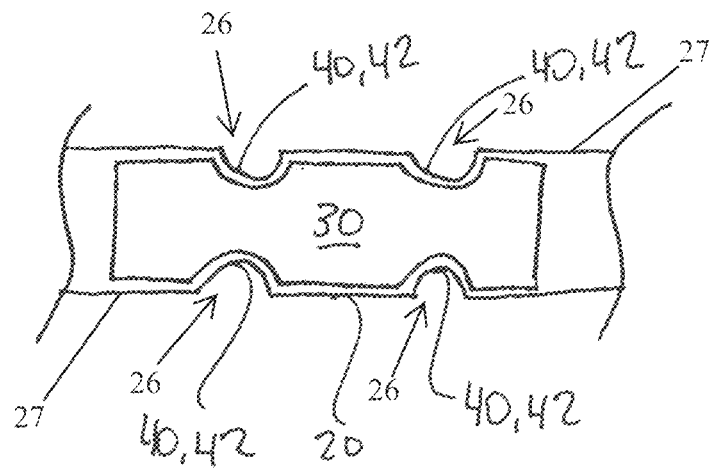
FIG. 4E is a cut-away and internal view of another embodiment of the filtered straw as disclosed herein.

With reference now to FIG. 4E, yet another embodiment is illustrated. In this embodiment, the filter medium 30 includes an at least partially flexible, bag-like body or configuration such that a plurality of internal projections 42 are capable of or adapted to engage or push against a side of the filter medium 30. For instance, the internal projections 42 may frictionally push against or engage the side of the filter medium 30 in order to at least partially retain the filter medium 30 within the body 20 of the straw 10. The filter 30 will remain retained against the projections 42 when fluid flows through the straw 10, and therefore, through the filter 30.

Another embodiment of the straw 10 is illustrated in FIGS. 6A and 6B. In this embodiment, one or more filters 30, such as, but not limited to, activate carbon fiber (ACF) filters with a fibrous mesh-like construction, are disposed within the internal passage of the body of the straw 10 such that the filters 30 are at least partially disposed or positioned end-to-end. The ends of the filters may, but need not necessarily, touch. Specifically, although end-to-end, the filters may be spaced from one another in some embodiments, while touching end-to-end in other embodiments.

In any event, in the embodiment shown in FIGS. 6A and 6B, the filter(s) 30 may be retained within the body 20 of the straw 10 by virtue of an at least partial frictional engagement between the surface of the filter(s) 30 and the internal passage or internal wall(s) of the straw 10. In this manner, retention structures, such as one or more internal projections, a mouth piece or cap, or an end cap, may not be need to retain the filter(s) 30 within the body 20. However, it should be noted that such an embodiment may, nevertheless, still include a mouth cap, end cap or other retention structures, as provided in accordance with other embodiments, herein.

For instance, still referring to the embodiment of FIGS. 6A and 6B, the filter(s) 30 may be structured to expand slightly, for example, when exposed to a liquid such as water. This is shown illustratively (and exaggerated) by reference arrows A in FIG. 6A. This expansion of the filter(s) 30 help facilitate a frictional engagement between the filter(s) 30 and the internal wall or surface of the straw 10, thereby 'locking' the filter(s) 30 in place, as shown in FIG. 6B.

As an example, as a human exerts a sucking pressure on one end of the straw, the filters 30 may be exposed to approximately 2-4 pounds per square inch (psi) of pressure. In this manner, the frictional engagement of the filter(s) 30 within the straw 10 should be able to withstand at least 2-4 psi, whether the filter is wet or dry, without being dislodged or forced out of the body 20 of the straw 10, and particularly, in the embodiment of the straw 10 that does not include any retention structures such as a mouth cap, end cap or internal projections to further retain the filter(s) 30 therein. In some cases, the filter(s) 30 may be able to withstand significantly more than 2-4 psi before being dislodged or forced out of the body 20, and in some embodiments, up to 60 psi or more, when the filter(s) 30 is/are wet or dry. Accordingly, in the event the straw 10 includes a uniform or constant cylindrical configuration with one or more open ends, as shown in FIGS. 6A and 6B, without an end cap, stopper or retention structure, the filter(s) 30 are capable of being retained within the body 20 of the straw 10 via a sufficient amount of frictional engagement capable of withstanding more than 2-4 psi of pressure applied thereto.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A filtered drinking straw, comprising:
   an elongated body comprising a first end, a second end and an internal passage disposed between said first end and said second end, said internal passage being adapted to allow a fluid to flow into said first end, through said internal passage and out of said second end when said first end is at least partially submerged in the fluid and an amount of suction is applied at said second end,
   at least one filter medium comprising an at least partially flexible body and disposed within said internal passage of said elongated body between said first end and said second end, said at least one filter medium being adapted to allow the fluid to flow there through while reducing an amount of impurities contained in the fluid such that the fluid that flows out of the second end of said body has fewer impurities than the fluid that flows into the first end of said body, and
   at least one retention structure configured to retain said at least one filter medium within said internal passage of said elongated body, said at least one retention structure comprising an internal projection disposed on an interior surface of said elongated body and an external indented groove disposed on an exterior surface of said elongated body,
   wherein said internal projection of said at least one retention structure is disposed in an engaged relation with a side of said at least partially flexible body of said filter medium, and wherein longitudinal movement of said filter medium within said internal passage is restricted.

2. The filtered drinking straw as recited in claim 1 further comprising a plurality of retention structures, said plurality of retention structures being structured to at least partially restrict movement of said at least one filter medium within said elongated body.

3. The filtered drinking straw as recited in claim 2 wherein at least one of said plurality of retention structures comprises an internal projection disposed on said interior surface of said body.

4. The filtered drinking straw as recited in claim 3 wherein each of said plurality of retention structures comprises an internal projection disposed on said interior surface of said body.

5. The filtered drinking straw as recited in claim 4 wherein each of said plurality of internal projections are disposed in an engaged relation with said side of said at least partially flexible body for retaining said filter medium there against.

6. The filtered drinking straw as recited in claim 5 wherein said plurality of internal projections are disposed in an at least partially frictional engagement with said at least partially flexible body of said filter medium to at least partially retain said filter medium within said hollow internal passage of said elongated body.

7. The filtered drinking straw as recited in claim 2 further comprising a mouth cap disposed on said second end of said body and a bottom cap disposed on said first end of said body, wherein said mouth cap and said bottom cap are structured to permit a flow of fluid there through.

8. A filtered drinking straw, comprising:
   an elongated body comprising a first end, a second end and an internal passage disposed between said first end and said second end, said internal passage being adapted to allow a fluid to flow into said first end, through said internal passage and out of said second end when said first end is at least partially submerged in the fluid and an amount of suction is applied at said second end,
   a filter medium disposed within said internal passage of said elongated body at least partially between said first end and said second end, said filter medium being adapted to allow the fluid to flow there through while reducing an amount of impurities contained in the fluid such that the fluid that flows out of the second end of said body has fewer impurities than the fluid that flows into the first end of said body,
   said filter medium comprising an at least partially flexible body defining a first end and a second end, said second end being opposite said first end,
   at least one retention structure disposed along a length of said elongated body, said at least one retention structure defining an internal projection disposed on an interior surface of said elongated body and an external indented groove disposed on an exterior surface of said elongated body, wherein an internal diameter of said elongated body and an external diameter of said elongated body are reduced at said at least one retention structure, and
   wherein said internal projection of said at least one retention structure is disposed in an engaged relation with a side of said at least partially flexible body of said filter medium, and wherein longitudinal movement of said filter medium within said internal passage is restricted by said at least one retention structure.

9. The filtered drinking straw as recited in claim 8 further comprising a mouth cap disposed on said second end of said elongated body.

10. The filtered drinking straw as recited in claim 8 further comprising a plurality of filter mediums, each of said plurality of filter mediums comprising a fibrous mesh-like structure of activated carbon fiber.

\* \* \* \* \*